(12) United States Patent
Kikura et al.

(10) Patent No.: US 8,007,391 B2
(45) Date of Patent: Aug. 30, 2011

(54) DIFFERENTIAL APPARATUS FOR VEHICLE

(75) Inventors: Takaharu Kikura, Tokyo (JP); Hiromi Hirase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 663 days.

(21) Appl. No.: 12/120,548

(22) Filed: May 14, 2008

(65) Prior Publication Data

US 2008/0287245 A1 Nov. 20, 2008

(30) Foreign Application Priority Data

May 15, 2007 (JP) .................................. 2007-128788

(51) Int. Cl.
*F16H 48/06* (2006.01)
(52) U.S. Cl. ........................ 475/225; 475/221
(58) Field of Classification Search .................. 475/221, 475/225
See application file for complete search history.

(56) References Cited

U.S. PATENT DOCUMENTS

| | | | | |
|---|---|---|---|---|
| 5,141,072 A | * | 8/1992 | Shibahata | 180/245 |
| 7,175,558 B2 | * | 2/2007 | Puiu et al. | 475/225 |
| 7,204,778 B1 | * | 4/2007 | Mimura | 475/225 |
| 7,344,469 B2 | * | 3/2008 | Sharma et al. | 475/221 |
| 7,507,178 B2 | * | 3/2009 | Rosemeier et al. | 475/205 |

FOREIGN PATENT DOCUMENTS

| | | |
|---|---|---|
| JP | 64-006548 A | 1/1989 |
| JP | 5-332405 A | 12/1993 |
| JP | 2004-278762 A | 10/2004 |

* cited by examiner

*Primary Examiner* — Ha D. Ho
(74) *Attorney, Agent, or Firm* — Dickstein Shapiro LLP

(57) ABSTRACT

An orthogonal axis gear, a planetary gear reduction mechanism portion, and a differential gear mechanism portion are arranged along an axial center direction of left and right output shafts. The planetary gear reduction mechanism portion is constituted such that a sun gear thereof is provided as a continuation of a crown gear of the orthogonal axis gear, a ring gear thereof is fixed to a differential case, and a planetary carrier thereof serves as an output. Further, the differential gear mechanism portion employs a planetary gear mechanism and is constituted such that a ring gear of the planetary gear mechanism is provided as a continuation of the planetary carrier of the planetary gear reduction mechanism portion, a planetary carrier thereof is provided as a continuation of the left side output shaft, and a sun gear thereof is provided as a continuation of the right side output shaft.

5 Claims, 5 Drawing Sheets

DIFFERENTIAL APPARATUS FOR VEHICLE

CROSS-REFERENCE TO RELATED APPLICATIONS

The disclosure of Japanese Patent Application No. 2007-128788, filed on May 15, 2007 including the specification, drawings and abstract, is incorporated herein by reference in its entirety.

BACKGROUND OF THE INVENTION

1. Field of the Invention

The present invention relates to a differential apparatus for a vehicle, and more particularly to a differential apparatus comprising an orthogonal axis gear that transmits the power of a front-rear extending input shaft to left and right output shafts.

2. Description of the Related Art

An apparatus disclosed in Japanese Unexamined Patent Application Publication 2004-278762 is known as a conventional differential apparatus comprising a hypoid gear, which is used widely as an orthogonal axis gear for a vehicle.

As shown in FIGS. 3 and 4 (FIGS. 1 and 2 of Japanese Unexamined Patent Application Publication 2004-278762), in this differential apparatus (11), the rotation direction of a front-rear extending input shaft (30) for transmitting engine power transmitted from a center differential apparatus (10) is shifted ninety degrees by a drive pinion gear (41) and a ring gear (35), and then the engine power is transmitted to a differential case (36), whereupon the engine power is transmitted to left and right output shafts (45), (46) by a differential gear mechanism constituted by pinion gears (39), (40) that rotate integrally with the differential case (36) and side gears (37), (38) that mesh with the pinion gears (39), (40).

With a hypoid gear, greater gear strength and a larger speed reduction ratio than those of a zero-offset bevel gear can be secured by offsetting the drive pinion gear, but as the offset increases, the transmission efficiency during a low load period deteriorates. Furthermore, the gear reaction force also increases in accordance with the offset of the hypoid gear, and therefore a tapered roller bearing, which requires a pre-load that can resist a powerful meshing reaction force, must be provided as the bearing of the input shaft. However, a tapered roller bearing is more expensive than a ball bearing and exhibits greater rolling resistance. Further, the tooth surface load and sliding velocity of the hypoid gear are large, and therefore sufficiently viscous lubricating oil must be used. However, the viscous resistance of such lubricating oil is great. Hence, a hypoid gear may cause deterioration of the fuel economy, thereby affecting the fuel economy of a vertically installed engine vehicle or a four-wheel drive vehicle comprising the hypoid gear.

Accordingly, the use of a small offset hypoid gear or a zero offset bevel gear in place of a large offset hypoid gear has been considered.

An apparatus disclosed in Japanese Unexamined Patent Application Publication S64-6548 is known as a differential apparatus employing a bevel gear.

As shown in FIG. 5 (FIG. 1 of Japanese Unexamined Patent Application Publication S64-6548), in this differential apparatus, the rotation direction of the power of a front-rear extending input shaft (1) is shifted ninety degrees by a small bevel gear (2) and a large bevel gear (3) forming the bevel gear, and then the power is transmitted to a housing (4). The power is then input into a sun gear (12) of a planetary gear reduction mechanism (5) that rotates integrally with the housing (4), a ring gear (14) of the planetary gear reduction mechanism (5) being fixed, and is then output from a planetary carrier (15) of the planetary gear reduction mechanism (5) to a differential box (6) that rotates integrally with the planetary carrier (15) inside the housing (4). Finally, the power is transmitted to left and right output shafts (9), (9) by a differential pinion (7) that rotates integrally with the differential box (6) and a differential side gear (8) that meshes with the differential pinion (7).

However, with the conventional differential apparatus disclosed in Japanese Unexamined Patent Application Publication 2004-278762, the differential case (36), which transmits power from the ring gear (35) to the differential gear mechanism and houses the pinion gears (39), (40) and side gears (37), (38), is disposed on the axial periphery of the left and right output shafts (45), (46). Likewise in the conventional differential apparatus disclosed in Japanese Unexamined Patent Application Publication S64-6548, the housing (4), which transmits power from the large bevel gear (3) to the planetary gear reduction mechanism (5) and houses the differential gears (7), (8), is disposed on the axial periphery of the left and right output shafts (9), (9). Hence, in both the former and the latter, the axial periphery of the left and right output shafts increases in diameter, leading to an increase in the size of the differential case.

SUMMARY OF THE INVENTION

The present invention has been designed in consideration of these circumstances, and it is an object thereof to provide a more compact differential apparatus for a vehicle.

To achieve this object, a first aspect of the invention is directed to a differential apparatus for a vehicle comprised of an orthogonal axis gear having a crown gear and a drive pinion gear that meshes with the crown gear and has an offset of zero or close to zero, the orthogonal axis gear shifting a rotation direction of an input shaft transmitting engine power to an orthogonal direction, a planetary gear reduction mechanism portion, to which the engine power is transmitted from the orthogonal axis gear, provided as a continuation of the crown gear, and a differential gear mechanism portion for transmitting the engine power to the left and right output shafts. In such a differential apparatus, the orthogonal axis gear, the planetary gear reduction mechanism portion, and the differential gear mechanism portion are arranged along an axial center direction of the left and right output shafts. Further, the planetary gear reduction mechanism portion is constituted such that a sun gear thereof is provided as a continuation of the crown gear, a ring gear thereof is fixed to a differential case, and a planetary carrier thereof serves as an output. In addition, the differential gear mechanism portion employs a planetary gear mechanism and is constituted such that a ring gear of the planetary gear mechanism is provided as a continuation of the planetary carrier of the planetary gear reduction mechanism portion, a planetary carrier thereof is provided as a continuation of one of the left and right output shafts, and a sun gear thereof is provided as a continuation of the other of the left and right output shafts.

Further, to achieve this object, in a second aspect of the invention pertaining to the first aspect of the invention, the planetary gear mechanism may be a double-pinion-type planetary gear mechanism.

According to the inventions, engine power transmitted by the input shaft is input from the crown gear of the orthogonal axis gear into the sun gear of the adjacent planetary gear reduction mechanism portion. The engine power is also input from the planetary carrier of the planetary gear reduction mechanism portion into the ring gear of the adjacent differential gear mechanism portion, which employs a planetary gear mechanism, and output from the planetary carrier and the sun gear of the differential gear mechanism portion to the left and right output shafts, respectively. Thus, power transmission from the input shaft to the planetary gear reduction mechanism portion, which is conventionally performed in a vertical direction, i.e. an orthogonal direction to (the diametrical direction of) the left and right output shafts, is shifted to a horizontal direction, i.e. an identical direction to the axial center direction of the left and right output shafts, and therefore the need for a conventional housing disposed on the axial periphery of the left and right output shafts can be eliminated, enabling a diametrical direction reduction in the diameter of the differential case.

Further, by employing a double pinion type planetary gear mechanism in the differential gear mechanism portion, the differential apparatus can be made more compact while obtaining an appropriate speed reduction ratio for a typical vehicle.

According to the differential apparatus of the present invention, the orthogonal axis gear, planetary gear reduction mechanism portion, and differential gear mechanism are arranged along the axial center direction of the left and right output shafts, and therefore a conventional housing is not required, enabling a reduction in the diameter of the axial periphery of the left and right output shafts. As a result, the differential apparatus can be made more compact than a conventional apparatus.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
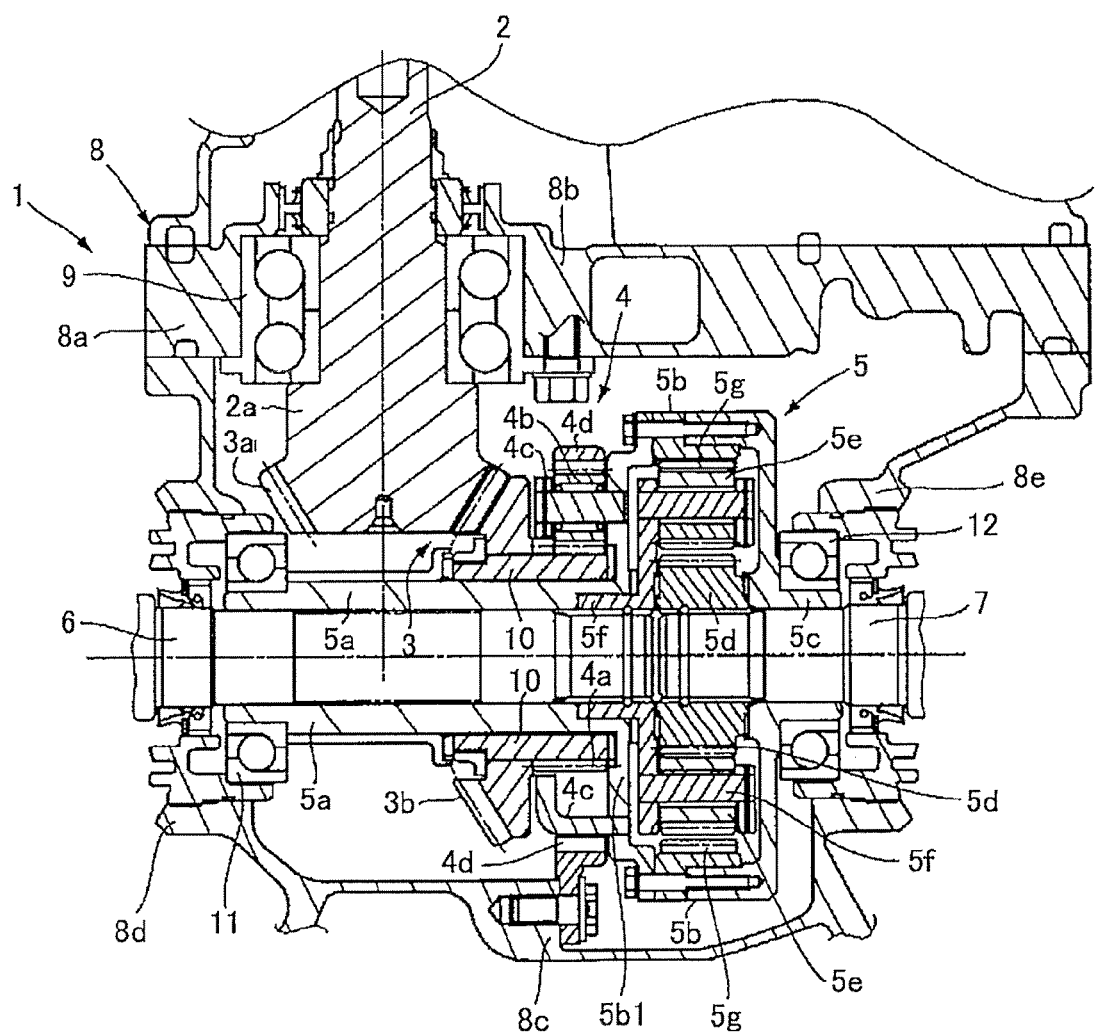
FIG. 1 is a sectional plan view showing a differential apparatus according to an embodiment of the present invention.

A differential apparatus according to an embodiment of the present invention will be described in detail below with reference to FIG. 1. FIG. 1 is a sectional plan view of the differential apparatus.

As shown in FIG. 1, a differential apparatus 1 is applied to a transaxle or rear differential for a vertically installed engine, and is constituted by an input shaft 2, a bevel gear 3 (for example, a straight bevel gear or a curved bevel gear) serving as an orthogonal axis gear, a planetary gear reduction mechanism portion 4, a differential gear mechanism portion (to be referred to hereafter as a planetary gear differential mechanism portion) 5 employing a planetary gear mechanism, and left and right output shafts 6, 7 for transmitting engine power transmitted from a speed change mechanism or a transfer mechanism to left and right drive wheels.

In more detail, the input shaft 2 is a power transmission shaft that extends in a front-rear direction, an output side (bevel gear side) 2a of which is supported rotatably between left and right support portions 8a, 8b of a differential case 8 via a double ball bearing 9 that is fixed by a bolt. An axial center direction of the input shaft 2 is orthogonal to an axial center direction of the left and right output shafts 6, 7, and a shaft end portion of the output side 2a of the input shaft 2 is disposed in close proximity to the left side output shaft 6. Further, a drive pinion gear 3a (input side) of the bevel gear 3 is provided integrally with the shaft end portion of the output side 2a of the input shaft 2. A crown gear 3b (output side) that meshes with the drive pinion gear 3a is provided as an integral continuation of one end portion of a tubular intermediate shaft 10 disposed coaxially with the left side output shaft 6.

Further, a main portion of the planetary gear reduction mechanism portion 4 and the planetary gear differential mechanism portion 5 is provided in parallel with the bevel gear 3 along the axial center direction of the left and right output shafts 6, 7. Moreover, a tubular case left portion 5a of the planetary gear differential mechanism portion 5 is interposed between the intermediate shaft 10 and the left side output shaft 6 so as to straddle the left and right output shafts 6, 7. The case left portion 5a and left side output shaft 6 are capable of relative rotation, and the case left portion 5a and intermediate shaft 10 are also capable of relative rotation.

The planetary gear reduction mechanism portion 4 is a single pinion type mechanism comprising a sun gear 4a, a pinion gear 4b, a planetary carrier 4c, and a ring gear 4d.

The sun gear 4a is allocated to input, and is formed integrally with the other end portion of the intermediate shaft 10. The pinion gear 4b, which meshes with the sun gear 4a, is disposed adjacently to the crown gear 3b, and the planetary carrier 4c, which supports the pinion gear 4b, is allocated to output. The planetary carrier 4c is supported in a cantilevered manner by a side surface portion 5b1 of a case center portion 5b of the planetary gear differential mechanism portion 5. Further, the ring gear 4d, which meshes with the pinion gear 4b, is allocated to fixing, and is fixed by a bolt to an attachment portion 8c of the differential case 8 so as to be positioned coaxially with the left side output shaft 6.

A rotation speed input into the planetary gear reduction mechanism portion 4 from the input shaft 2 via the bevel gear 3 is reduced by a speed reduction ratio (a+c)/a set in accordance with a number of teeth a of the sun gear 4a and a number of teeth c of the ring gear 4d, and then transmitted to the case left portion 5a, the case center portion 5b, and a case right portion 5c of the planetary gear differential mechanism portion 5. Further, the planetary gear reduction mechanism portion 4 rotates the planetary carrier 4c in an identical direction to the rotation direction of the sun gear 4a.

The planetary gear differential mechanism portion 5 is a double pinion type mechanism disposed in parallel with the planetary gear reduction mechanism portion 4, and comprises the case 5a to 5c, a sun gear 5d, a double pinion gear 5e, a planetary carrier 5f, and a ring gear g.

Left and right end portions of the case 5a to 5c are supported rotatably by support portions 8d, 8e of the differential case 8 via ball bearings 11, 12, respectively. The left and right output shafts 6, 7 are inserted into the interior of the case left portion 5a and case right portion 5c, respectively, so as to be capable of relative rotation, while the sun gear 5d, double pinion gear 5e, planetary carrier 5f, and ring gear 5g are disposed in the case center portion 5b. In the planetary gear differential mechanism portion 5, the ring gear 5g is allocated to input, while the planetary carrier 5f and sun gear 5d are allocated to output.

The ring gear 5g is provided integrally with an inner peripheral surface side of the case center portion 5b on the circumference of the right side output shaft 7. The planetary carrier 5f, which rotatably supports the double pinion gear 5e that meshes with the ring gear 5g, is provided as an integral continuation of the shaft end portion of the left side output shaft 6. Further, the sun gear 5d, which meshes with the double pinion gear 5e, is provided as an integral continuation of the shaft end portion of the right side output shaft 7. Thus, engine power transmitted to the ring gear 5g is transmitted to the left side output shaft 6 from the double pinion gear 5e that meshes with the ring gear 5g via the planetary carrier 5f, and to the right side output shaft 7 via the sun gear 5g that meshes with the double pinion gear 5e. Furthermore, in the planetary gear differential mechanism portion 5, the planetary carrier 5f and the sun gear 5d rotate in an identical direction to the rotation direction of the ring gear 5g.

Note that in this embodiment, a zero offset bevel gear (intersecting axis gear) is employed as the orthogonal axis gear, but the present invention is not limited thereto, and a hypoid gear that is close to zero offset (a skew gear) may be used.

Furthermore, in this embodiment, a double pinion type planetary gear mechanism is employed in the differential mechanism portion, but the present invention is not limited thereto, and a single pinion type planetary gear mechanism may be used.

Figure 2:
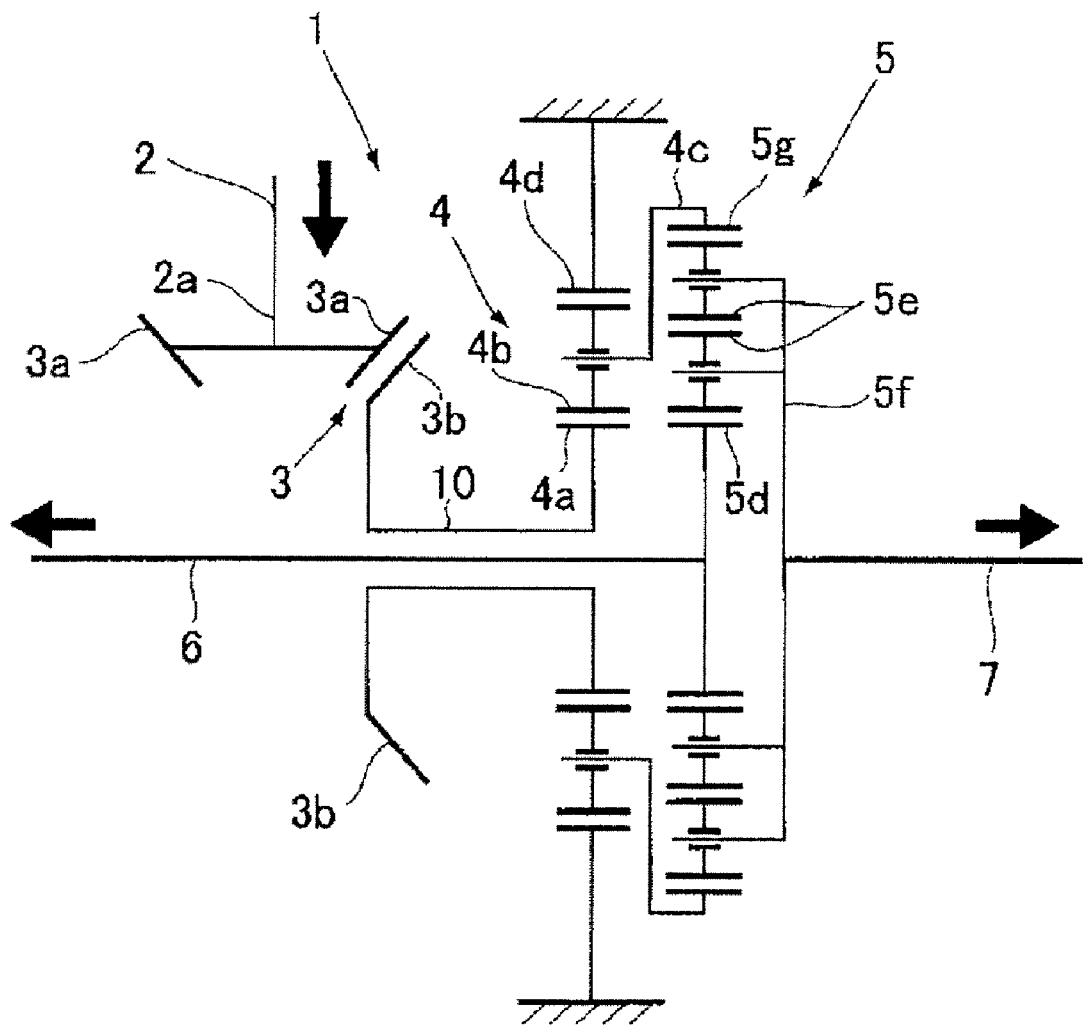
FIG. 2 is a pattern diagram showing a modified example of the differential apparatus.
Figure 3:
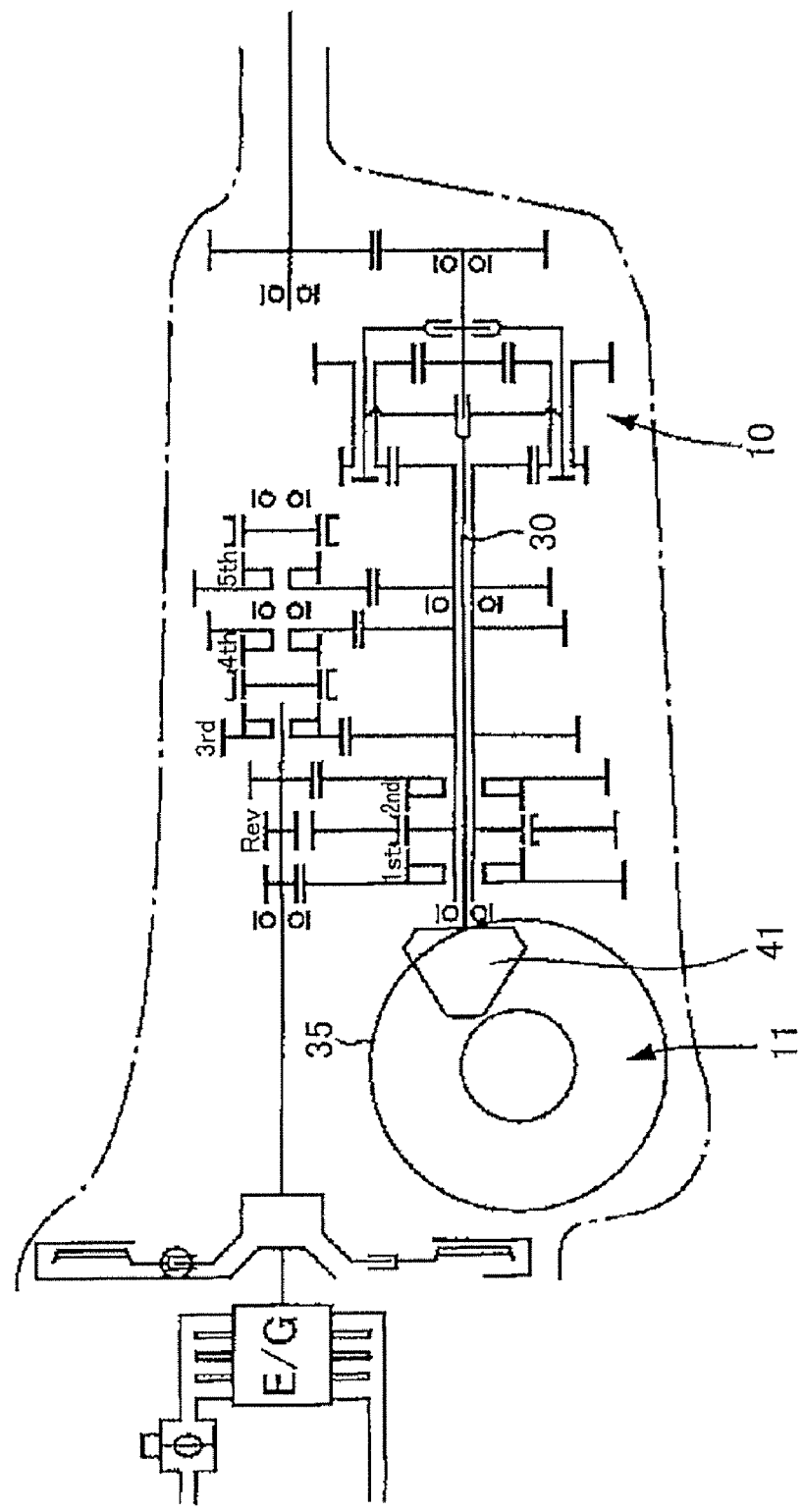
FIG. 3 is a skeleton diagram showing a manual transmission provided in a conventional differential apparatus.
Figure 4:
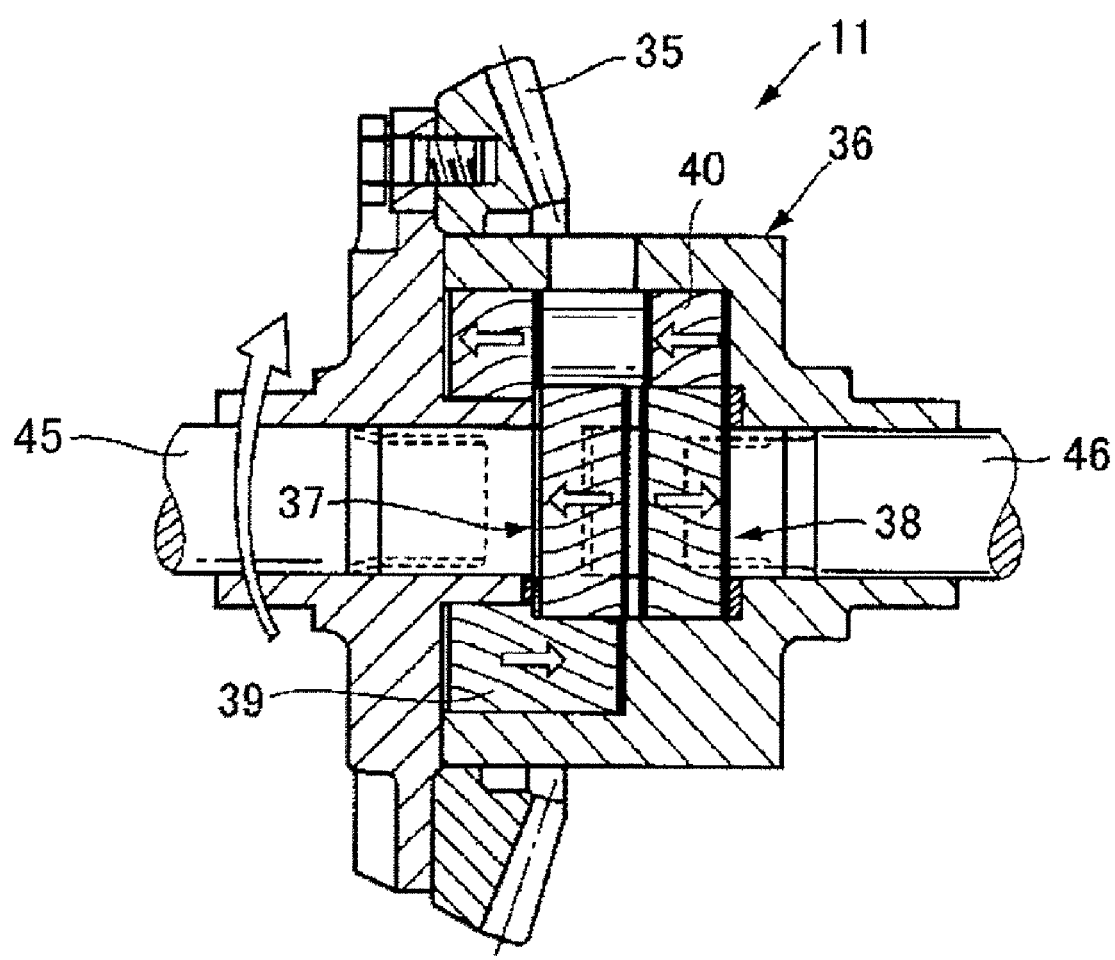
FIG. 4 is a sectional view showing the differential apparatus of FIG. 3.
Figure 5:
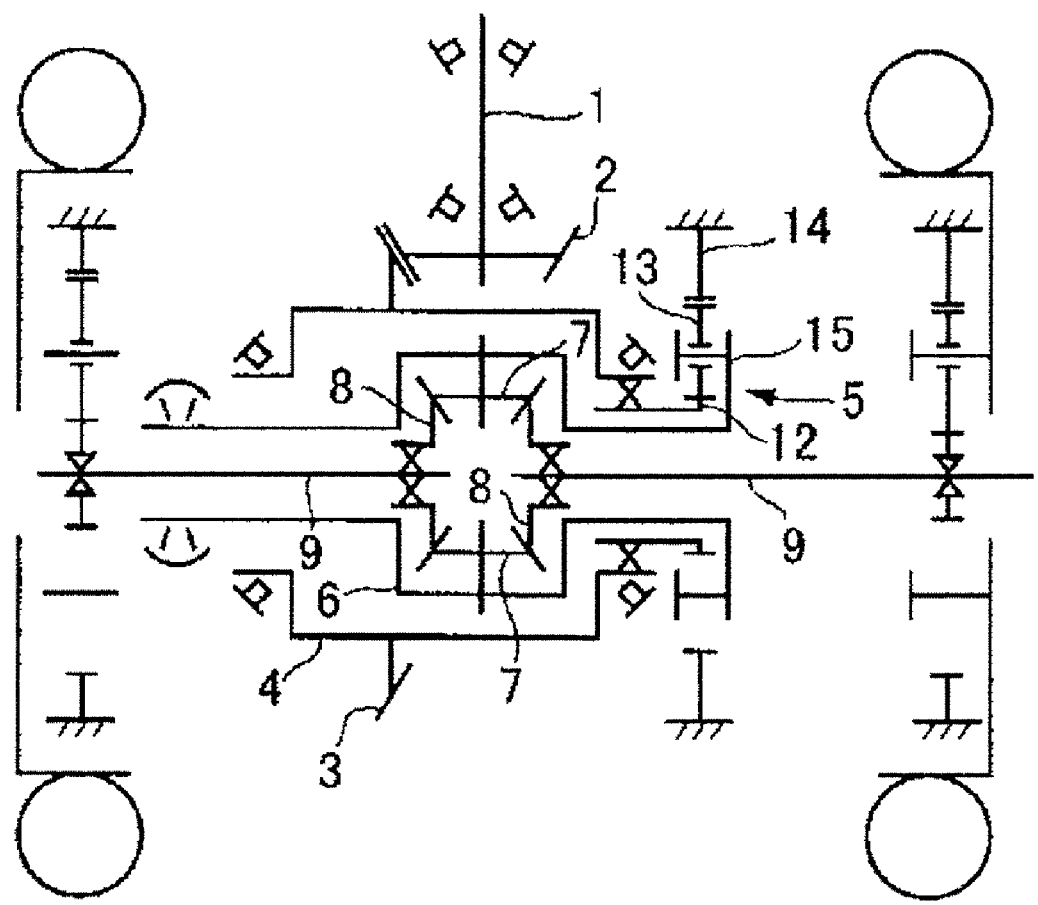
FIG. 5 is a pattern diagram showing a different conventional differential apparatus to that shown in FIG. 3.

Further, in this embodiment, the planetary carrier 5f of the planetary gear differential mechanism portion 5 is provided as a continuation of the shaft end portion of the left side output shaft 6, and the sun gear 5d is provided as a continuation of the shaft end portion of the right side output shaft 7, but the present invention is not limited thereto, and as a shown in FIG. 2, the planetary carrier 5f and sun gear 5d may be provided as continuations of the right side output shaft 7 and left side output shaft 6, respectively.

According to the present invention described above, engine power transmitted by the input shaft 2 is input from the crown gear 3b of the bevel gear 3 into the sun gear 4a of the adjacent planetary gear reduction mechanism portion 4. The engine power is also input from the planetary carrier 4c of the planetary gear reduction mechanism portion 4 into the ring gear 5g of the adjacent planetary gear differential mechanism portion 5, and output from the planetary carrier 5f of the planetary gear differential mechanism portion 5 to the left side output shaft 6 and from the sun gear 5d to the right side output shaft 7. Thus, power transmission from the input shaft 2 to the planetary gear reduction mechanism portion 4, which is conventionally performed in a vertical direction, i.e. an orthogonal direction to (the diametrical direction of) the left and right output shafts 6, 7, is shifted to a horizontal direction, i.e. an identical direction to the axial center direction of the left and right output shafts 6, 7, and therefore the need for a conventional housing disposed on the axial periphery of the left and right output shafts 6, 7 can be eliminated, enabling a reducing in the diameter of the differential case 8.

Further, by employing a double pinion type planetary gear mechanism in the differential gear mechanism portion, the differential apparatus 1 can be made more compact while obtaining an appropriate speed reduction ratio for a typical vehicle.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A differential apparatus for a vehicle comprising:
   an orthogonal axis gear having a crown gear and a drive pinion gear that meshes with said crown gear and has an offset of zero or close to zero, said orthogonal axis gear shifting a rotation direction of an input shaft transmitting engine power to an orthogonal direction;
   a planetary gear reduction mechanism portion, to which said engine power is transmitted from said orthogonal axis gear, provided as a continuation of said crown gear; and
   a differential gear mechanism portion for transmitting said engine power to the left and right output shafts,
   wherein
   said orthogonal axis gear, said planetary gear reduction mechanism portion and said differential gear mechanism portion are arranged along an axial center direction of said left and right output shafts,
   said planetary gear reduction mechanism portion is constituted such that a sun gear of the planetary gear reduction mechanism portion is provided as a continuation of said crown gear, a ring gear thereof is fixed to a differential case, and a planetary carrier of the planetary gear reduction mechanism portion serves as an output, and
   said differential gear mechanism portion employs a planetary gear mechanism and is constituted such that a ring gear of said planetary gear mechanism is provided as a continuation of said planetary carrier of said planetary gear reduction mechanism portion, a planetary carrier of the differential gear mechanism portion is provided as a continuation of one of said left and right output shafts, and a sun gear of the differential gear mechanism portion is provided as a continuation of the other of said left and right output shafts.

2. The differential apparatus for a vehicle according to claim 1, wherein said planetary gear mechanism is a double-pinion planetary gear mechanism.

3. The differential apparatus for a vehicle according to claim 1, wherein said differential gear mechanism portion has a case comprising 3 portions of a center portion, a left portion and a right portion, a left end of the left portion and a right end of the right portion being rotatably supported by said differential case, and said ring gear of the differential gear mechanism portion being fixed on the center portion.

4. The differential apparatus for a vehicle according to claim 3, wherein said left and right output shafts are rotatably inserted into an interior of the left and right portions, respectively, so as to allow them to relatively rotate.

5. The differential apparatus for a vehicle according to claim 3, wherein an intermediate shaft connecting with the crown gear and the sun gear of the planetary gear reduction mechanism portion is rotatably supported on an exterior of the left portion of the case.

* * * * *